US007191151B1

(12) United States Patent
Nosek

(10) Patent No.: US 7,191,151 B1
(45) Date of Patent: Mar. 13, 2007

(54) INSTANT AVAILABILITY OF ELECTRONICALLY TRANSFERRED FUNDS

(75) Inventor: Luke Paul Nosek, Palo Alto, CA (US)

(73) Assignee: PayPal, Inc., Mountain View, CA (US)

( * ) Notice: Subject to any disclaimer, the term of this patent is extended or adjusted under 35 U.S.C. 154(b) by 1317 days.

(21) Appl. No.: 09/938,224

(22) Filed: Aug. 23, 2001

(51) Int. Cl.
*G06Q 40/00* (2006.01)

(52) U.S. Cl. .......................................... 705/39; 705/44

(58) Field of Classification Search ................ 705/39, 705/44
See application file for complete search history.

(56) References Cited

U.S. PATENT DOCUMENTS

| 5,778,178 | A | 7/1998 | Arunachalam |
| 5,987,500 | A | 11/1999 | Arunachalam |
| 6,212,556 | B1 | 4/2001 | Arunachalam |
| 6,243,689 | B1 * | 6/2001 | Norton ........................ 705/18 |

FOREIGN PATENT DOCUMENTS

EP         0481135 A1 * 10/1990

OTHER PUBLICATIONS

O'Sullivan, Orla. When a Check is not a Check. US Banker. New York, Jul. 1999. vol. 19, Iss. 7 (5 pages).*
Gilje, Shelby. Video Values—There's More to Renting a Video than Price. Seattle Times. Seattle, Wash. Jun. 11, 1993. (4 pages).*
Bendo, Yvonne. Here's What it Takes to Get the Goods from Rental Outlets. Toronto Star. Toronto, Ont. Apr. 16, 1989. (3 pages).*
Campbell, D. Keeping up with Video Rental Records. Los Angeles Times. Los Angeles, Calif. May 21, 1987. (3 pages).*
Anonymous. Debit Still Waiting for a Frequent Shopper Boom. POS News. Jun. 1992. vol. 9, Iss. 1 (4 pages).*
Campbell, Don G. "Keeping Up with Video Rental Records", Los Angeles Times; May 21, 1987. (3 pages).*

* cited by examiner

*Primary Examiner*—Richard E. Chilcot, Jr.
*Assistant Examiner*—Jennifer L. Liversedge
(74) *Attorney, Agent, or Firm*—Park, Vaughan & Fleming LLP

(57) ABSTRACT

A system and method for making proceeds of an ACH (Automated Clearing House) transaction available to a user before the transaction is completed. The system may be part of an on-line or traditional merchant or system configured to allow or facilitate payments or fund transfers from users. When a user requests payment or transfer of funds to an entity (e.g., another user, a merchant, the user's account with the system) via an ACH entry, the system authorizes the amount against a credit source of the user or otherwise verifies that the user has sufficient credit to cover the payment/transfer. If the authorization succeeds, the system places a hold on the credit source in the amount of the transaction. The ACH entry is then initiated and the desired funds are released. If the ACH transaction is rejected or returned, the user's credit source is charged.

27 Claims, 3 Drawing Sheets

INSTANT AVAILABILITY OF ELECTRONICALLY TRANSFERRED FUNDS

BACKGROUND

A system and methods are provided for releasing the proceeds of an ACH (Automated Clearing House) transaction, or other electronic fund transfer, before it has settled or cleared, based on the availability of a credit source associated with the payee.

Among the existing methods of making purchases, particularly consumer purchases, and transferring funds from one person to another, ACH transactions have been used sparingly. One reason for their lack of popularity is that the recipient of funds from the purchase or transfer (e.g., a business) usually desires receipt of the funds relatively quickly. For example, a merchant is understandably reluctant to deliver his goods or services until payment is assured. ACH transactions are not typically settled, however, until at least one business day later, and may be rejected or returned before, or even after, settlement.

Thus, when timely consummation of a transaction is desired, the relatively lengthy period of time that elapses between the initiation of an ACH transaction and the final availability of the funds involved in the transaction tend to make them an unattractive option. Credit cards, debit cards, ATM (Automated Teller Machine) cards and other sources of instantly available funds are much more compatible with the need for instant gratification and thus tend to be more popular in typical consumer purchases or fund transfers.

The delay encountered with ACH transactions is inherent in the way they are handled. An ACH transaction, or entry, is initiated by an originator (e.g., a company or organization) that is directing the transfer of funds on behalf of, and with the authorization of, a receiver (e.g., a customer). Thus, originator and receiver refer to the entities that initiate and receive an ACH entry, which may be either a credit or a debit to the receiver's account. An originator sends the transfer instructions to an originating depository financial institution (ODFI). The ODFI forwards ACH entries to an ACH operator (e.g., a Federal Reserve Bank) for settlement. ACH entries are then sent to the respective receiving depository financial institutions (RDFI) where they are posted to the appropriate depositors' (receivers) accounts. Although ACH transactions are generally conducted electronically, they are batch-processed instead of being handled one at a time.

An ACH credit entry occurs when an originator initiates a transfer to move funds into a receiver's account. For example, a person may be the recipient of ACH credit funds in the form of direct deposit (e.g., of his or her salary). In this case, the employer is the originator and the employee is the receiver. Or, a consumer may act as an originator by authorizing monthly payments (e.g., for a utility, Internet access, loan payment) to a creditor, which then acts as the receiver.

Funds flow in the opposite direction for an ACH debit entry. In particular, funds are collected from a receiver's account and transferred to an originator's account. Thus, when a consumer preauthorizes a debit, the originator is the company or other entity authorized to collect the debt and the consumer is the receiver.

During the settlement or clearing process, a depository financial institution or ACH operator may "reject" an ACH entry because it is formatted incorrectly or is otherwise unacceptable. Accepted ACH entries are then settled on the assumption that the funds are available and will be transferred as specified. Settlement of an ACH entry generally occurs on the business day following its initiation. However, even after settlement, an RDFI may "return" an ACH debit entry due to insufficient funds in the receiver's account. Thus, settlement of an ACH debit does not guarantee that the receiver has sufficient funds to cover the entry. If the originator, or the ODFI processing an ACH entry for the originator, releases the funds of the entry too soon, and the RDFI later determines that the receiver has insufficient funds and therefore "returns" the entry, the originator or ODFI may be at risk of losing those funds.

Although ACH transactions may be riskier or slower for a merchant than credit cards and instruments such as debit cards and ATM cards, they are less expensive. In particular, for each credit card transaction accepted by a merchant, the merchant may have to pay a fixed fee plus a percentage of the value of the transaction. For an ATM card, a merchant may have to pay a fixed fee similar in magnitude to that assessed in a credit card transaction. However, the cost to a merchant of an ACH transaction may be on the order of just a few cents. If ACH transactions were employed for more consumer transactions, merchants' costs would be decreased, and these savings could be passed on to consumers.

Therefore, what is needed is a method of making the proceeds of an ACH entry available without the delay that is normally incurred in ensuring that they are available.

SUMMARY

In one embodiment of the invention, a system and methods are provided for making a receiver's (e.g., system user or consumer) bank account funds that are the subject of an ACH (Automated Clearing House) transaction available without the delay that is normally inherent in such transactions.

In this embodiment of the invention, the system receives a request from a receiver to conduct a transaction involving a first value. The transaction may involve the payment or transfer of funds to another entity (e.g., a merchant) or the receiver's own account with the system. The system authorizes the first value against a credit source (e.g., a credit card, credit line) associated with the receiver, which may be a credit line established for the receiver by the system. The system then places a hold against the credit source for the first value, in order to hold that amount for the system to charge, if necessary. The system then takes on the role of an ACH originator and initiates an ACH debit, in the amount of the first value, to retrieve it from an account the receiver has with a financial institution (e.g., bank, credit union, mutual fund, brokerage, savings and loan). If the ACH debit is rejected or returned, all or a portion of the first value may be charged against the credit source.

When a receiver requests a value transfer to be conducted, payment via ACH may be the default method of paying for the transfer; other options may, however, be selectable (e.g., credit card). In addition, if the user has verified multiple financial accounts (or other accounts from which ACH funds may be drawn) and/or multiple credit sources, the user may be prompted to select from the multiple accounts and/or credit sources.

In another embodiment of the invention, instead of doing an authorization and/or a hold against the entity's credit source before initiating the ACH debit process, the system may actually charge the value to the credit source. Then, if the ACH debit settles without incident, the credit source may be credited with the amount received via the debit (e.g., which may be all or just a portion of the amount requested).

DETAILED DESCRIPTION

Figure 1A:
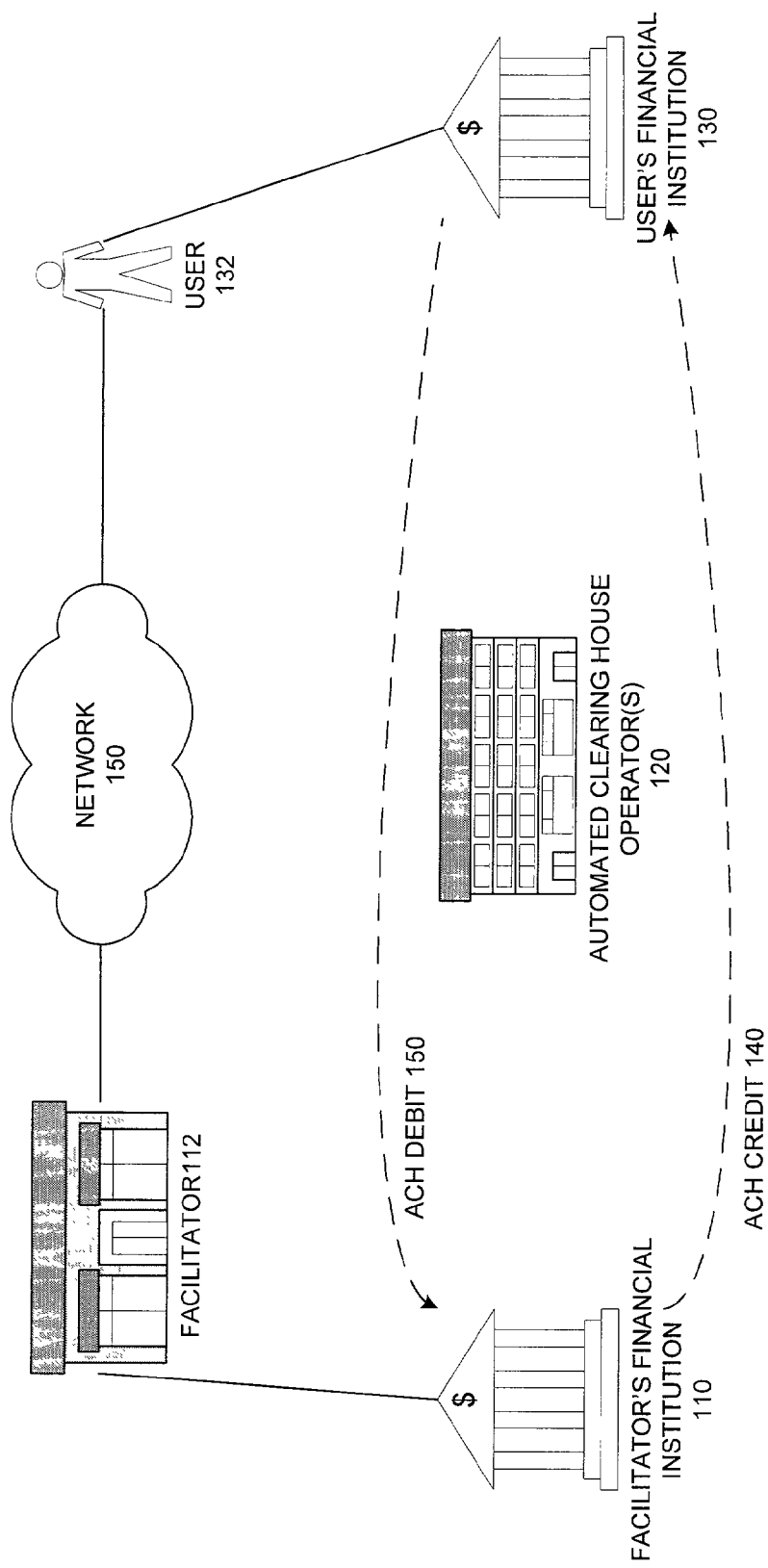
FIG. 1A is a block diagram depicting one environment in which ACH debit funds may be made available before the ACH debit entry is cleared through an Automated Clearing House (ACH) process, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed may incorporate a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for making available the proceeds of an ACH (Automated Clearing House) transaction or entry—particularly an ACH debit entry—without waiting for the debit to pass through the entire ACH clearing process. Thus, funds deposited or invested with a financial institution (e.g., bank, credit union, savings and loan, mutual fund) may be accessed using the ACH process, but without the normal delay. A user or consumer may choose, for example, to pay for a transaction (e.g., purchase a good or service, transfer funds to another person or entity, transfer funds into the user's account) with funds from his or her banking institution.

To reflect the terms used in ACH transactions, the consumer or user may be considered the receiver, while the system acts as the originator of an ACH entry configured to send funds to or retrieve funds from a financial account specified by the receiver. The originator may initiate an ACH entry through an ODFI (Originating Depository Financial Institution), and the institution holding the receiver's funds that are targeted by the ACH entry is the RDFI (Receiving Depository Financial Institution).

In one method according to the invention, the funds of an ACH transaction are authorized, held or allocated against an available credit source (e.g., credit card, credit line, debit card) and may be released or made available immediately thereafter as long as the authorization operation is successful. If the ACH entry is rejected or returned, then the funds are charged to the credit source. If the ACH process is successful, the authorization or hold may be removed.

In one alternative method of the invention, the funds may be charged against the credit source at the time the ACH entry is initiated and, if the ACH transaction is successful, the funds may then be credited back to the credit source.

Thus, funds from a user or consumer's bank account may be available to a consumer or other entity without the normal delay, and ACH transactions can therefore be as convenient to the user as a credit card or other instrument. In addition, the merchant or other institution accepting the user's ACH transaction may benefit from the lower costs normally assessed on such transactions.

In a typical ACH debit process, the funds requested by the ODFI from the RDFI may be received within a few business days after the debit is initiated. Or, the ODFI may be notified that insufficient funds are available to complete the transaction. Even if the funds are received within a few days, however, they may be retracted by the RDFI if it determines that the receiver's account has insufficient funds. Thus, until a sufficient period of time passes for the RDFI to check for available funds (e.g., several business days), the ODFI risks making the funds available to or for the originator (e.g., to pay a bill, make a purchase, transfer them to another entity) and not recouping them from the RDFI.

FIG. 1A depicts an environment in which a system user (e.g., a receiver) may receive the use of funds requested via an ACH debit, before the ACH debit entry is completed, according to one embodiment of the invention. The funds may be desired for various types of transactions, such as making a purchase, transferring funds from one user account to another account, to another entity, etc.

Illustratively, the user has chosen to use, or accepted a default selection to use, funds from his or her bank account or other account that allows funds to be transferred or withdrawn via an ACH process. In addition, if the user has verified multiple bank accounts (or other accounts from which ACH funds may be drawn) and/or multiple credit sources, the user may be prompted to select from the multiple accounts and/or credit sources.

In FIG. 1A, financial institutions 110, 130 are banks, savings and loans, credit unions, mutual funds, investment companies or other entities capable of conducting ACH transactions. Thus, institution 110 is configured as an ODFI to initiate ACH entries (e.g., on behalf of facilitator/originator 112), while institution 130 is configured as an RDFI to receive ACH entries (e.g., on behalf of user/receiver 132). ACH entries are processed and settled through ACH operator 120, which may comprise any number of operators—such as separate originating and receiving operators. Thus, ODFI 110 may initiate ACH credit 140 to send funds (e.g., from an originator account at institution 110) to RDFI 130 and/or initiate ACH debit 150 to receive funds from a receiver account at institution 130.

In this embodiment of the system, facilitator 112 uses the services of institution 110 to perform ACH transactions and/or other transactions (e.g., credit card, debit card, ATM card). Facilitator 112 may be a retail or wholesale merchant or other business, may operate on-line via public network 150 (e.g., the Internet), via telephone, in a traditional "brick and mortar" venue, etc. In one particular embodiment of the invention, facilitator 112 is an on-line entity that allows users to make purchases, make investments, transfer value (e.g., money) to and/or from another entity (e.g., a business, a financial instrument, another user), etc. Thus, services offered by facilitator 112 may be employed by user 132 to buy something, pay a debt or bill, transfer value to another user, etc.

U.S. patent application Ser. No. 09/560,215, entitled "System and Method for Electronically Exchanging Value Among Distributed Users" and filed Apr. 28, 2000, describes a system and method for facilitating the electronic exchange of value between users and is hereby incorporated in its entirety.

In the illustrated embodiment of the invention, user 132 has an account with financial institution 130 (e.g., a checking or other account compatible with ACH transactions). User 132 may interact with facilitator 112 directly or through network 150 with a desktop, notebook, handheld or other type of computing or communication device, via wired or wireless technology.

Before initiating an ACH transaction on behalf of user 132, facilitator 112 may require verification of the user's account with financial institution 130 and the availability of some form of credit. The credit source may be a credit card or a credit line granted by facilitator 112, institution 130 or some other entity, or may be a debit card, ATM card or some other type of credit now known or hereafter developed.

In one method of the invention, facilitator 112 receives a request from user 132 to pay some amount of value to a specified entity (e.g., a merchant, another user). Facilitator 112 may require the user to register before allowing such action, and verify that the user has an account with institution 130 and a valid source of credit, that the user can be reached at a particular electronic mail address, physical address, telephone number, etc. Facilitator 112 may grant a user an internal line of credit based on a credit check, verification of the user's personal data, etc.

After the user's account with institution 130 and credit source are verified, facilitator 112 may attempt to authorize and hold the requested amount of value against the user's credit source. This may be done through financial institution 110 or some other third party. If this action fails, the user's requested transaction may be rejected. If this action succeeds, however, then the funds may be released as requested and the ACH process may be initiated to retrieve the funds from the user's account at institution 130. If the ACH process succeeds, then the authorize/hold on the user's credit source may be removed or allowed to expire. If the ACH process fails, then the funds are charged against the user's credit source.

Figure 1B:
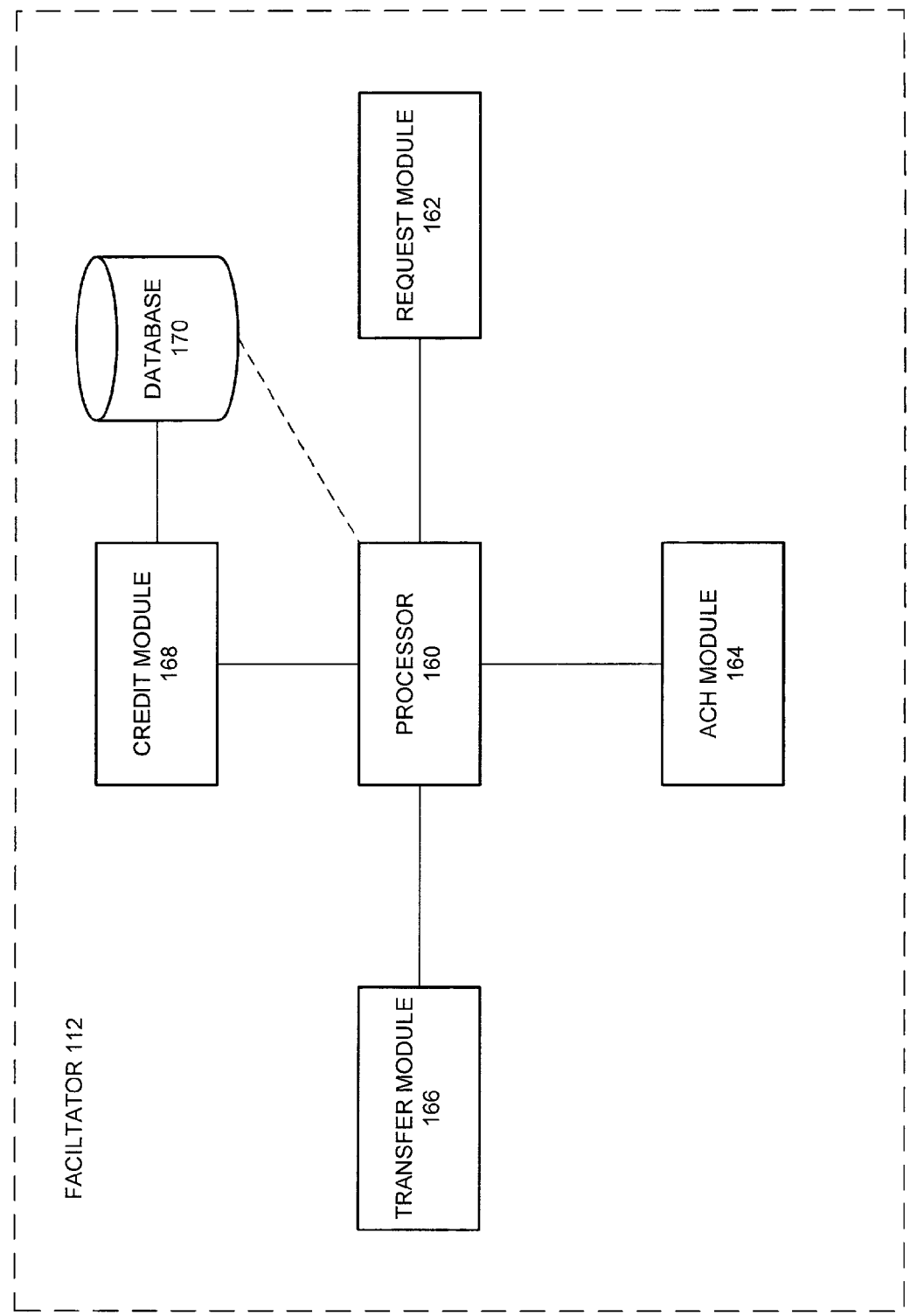
FIG. 1B is a block diagram of the facilitator of FIG. 1A, according to one embodiment of the invention.

FIG. 1B is a block diagram depicting one embodiment of facilitator 112 (of FIG. 1A) for accepting an ACH debit as a source for a payment or transfer of funds before debit is cleared through the ACH process.

In the embodiment of FIG. 1B, facilitator 112 includes processor 160 to coordinate its various tasks involved in receiving a value transfer request, initiating an ACH debit (or credit) entry, ensuring credit availability and performing the transfer. Processor 160 may include or operate any of the various modules depicted in FIG. 1B. Additionally, facilitator 112 may include multiple processors and each processor may control any of the modules. Yet further, the modules may be distributed across one or more distinct computer systems that cooperate to function as facilitator 112.

Illustratively, request module 162 receives the value transfer request from a user and may elicit any information that is needed or not already possessed by the facilitator (e.g., ABA (American Bankers Association) number, routing number, credit source). ACH module 164 is configured to initiate an ACH process (e.g., debit or credit) under the direction of processor 160 (e.g., after a user's credit availability has been verified). ACH module 164 may thus interact with institution 110 (of FIG. 1A) or another entity involved in the ACH process. Transfer module 166 is configured to perform the requested value transfer after credit availability has been verified and may also interact with institution 110.

In the embodiment of the invention illustrated in FIG. 1B, credit module 168 is configured to identify or verify a user's credit source, and/or perform any or all of the necessary actions to ensure that funds transferred at the request of the user are available, held and/or charged to the credit source if needed. Thus, the credit module may perform an authorization, a hold and or a charge action against the credit source. Credit module 168 and/or processor 160 may access database 170 to retrieve and/or store various information concerning a user (e.g., bank account number, credit card number, electronic mail address).

Figure 2:
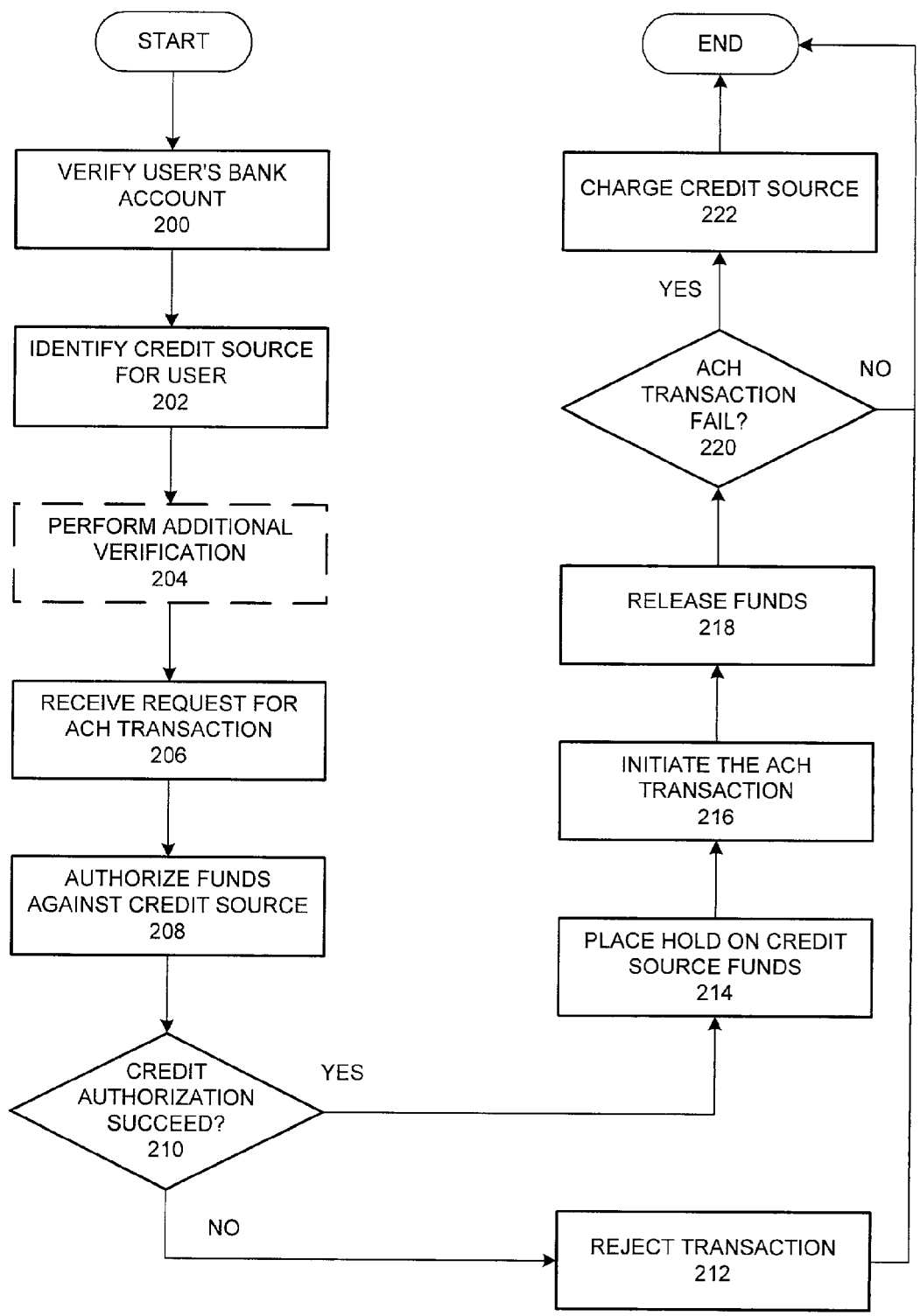
FIG. 2 is a flowchart illustrating one method of making funds from an ACH debit available before the debit entry clears, in accordance with an embodiment of the invention.

FIG. 2 is a flowchart demonstrating, in further detail, one method of employing a system such as that of FIG. 1A to make funds from a user's bank account (or similar source) available before an ACH debit to that account clears, according to one embodiment of the invention.

In this embodiment, one entity (e.g., user, consumer) wishes to transfer or pay some amount of value, from his or her account with a bank or other financial institution, to another entity, using a payment/transfer service such as facilitator 112 of FIG. 1A. The user may already be known to and have an account with the system, or may register and initiate the following procedure at the time the payment or transfer is desired.

In state 200, the payment/transfer system verifies the user's bank account that an ACH transaction will target. The system may, for example, elicit the necessary ABA (American Bankers Association) routing number and account number from the user (which the user may retrieve from a paper check associated with the bank account). Existence of the account may then be verified by any practical means (e.g., electronic query or telephone call to the bank). If the user's bank account cannot be verified, or does not appear to be associated with this user, the system will not attempt to draw upon it and a different bank account will have to be identified and verified in order for the user to use the system.

In state 202, the system identifies and/or verifies a credit source available to the user, or may establish one for the user. Thus, the credit source may be internal to the system (e.g., the system may offer lines of credit to some or all users) or external (e.g., a credit card, charge card, other line of credit). Illustratively, the user may provide the details of a credit card (e.g., name, number, expiration date) and the system may query an electronic service (e.g., offered by the credit source or a third party) to ensure that the card has not been reported as lost or stolen or otherwise invalidated. Further, for an external credit source, the system may verify that the source has available credit by performing an authorization for a small amount (e.g., one dollar). If the authorization fails, then the user will not be allowed to make a payment or transfer with this credit source.

If the system is configured to grant internal lines of credit to users, the system may perform additional verifications of the user's personal data (e.g., physical address, employer, telephone number), perform a credit check, determine if the user has had any previous transfers/payments through the system rejected, etc.

In state 204, which is optional, additional verification of the user's bank account and/or credit source may be performed, depending on what was done in states 200–202. For example, to verify the user's control of the bank account, the system may make a deposit to the account and require the user to identify the amount and/or date of the deposit. Presumably, the user must have access to the account to obtain this information. And, if not already done, the system may perform a dollar (or other small amount) authorization against the credit source.

In state 206 the system receives a request from the user to make a payment or transfer to another entity. The request may be received directly from the user (e.g., the user may be visiting a web site associated with the system), from a merchant that is being visited by the user and which has a suitable agreement with the system, etc. Thus, the request may be received on-line, or may be received in person, telephonically, via electronic or regular mail, etc.

Various pieces of information may be included in the request or may be elicited by the system. Such information may include an identity of the recipient and an amount to be transferred, and will indicate that the user wishes to make the payment/transfer using his/her verified bank account (e.g., through an ACH entry). Illustratively, the recipient may be another user of the system, in which case he or she may be identified with a user name, account name or number, electronic mail address, telephone number, social security number or other unique form of identification. In one embodiment of the invention the user may employ this process to transfer funds from the bank account into his or her account with the system. The user may select a "pay by bank account," "electronic debit," or similarly worded option from a list identifying acceptable methods of payment, or the system may mark this option as a default, in which case the user may accept it or choose another option. Illustratively, other options may include payment by credit card, regular ACH (e.g., without immediate release of the funds), debit card, ATM card, etc.

In state 208 the specified funds are authorized against the user's credit source. Illustratively, if the credit source is a credit card, this involves an established procedure in which the system verifies with the credit card issuer or institution that the user's account has sufficient available or unused credit to cover the amount of the payment/transfer (in the event the ACH entry is rejected or returned).

In state 210 the system determines whether the authorization was successful. If so, then the illustrated procedure continues at state 214. Otherwise, in state 212 the user's transaction is rejected and the process ends.

In state 214, the system places a hold on the user's credit source, in the amount of the payment/transfer. Illustratively, for a credit card this action involves an established procedure in which the credit card institution is directed or requested to reserve the specified amount of credit from being used or charged by other entities. Thus, by holding the funds with the credit source, the system can ensure that the funds will be available if the ACH transaction fails. Depending on how long a hold normally lasts (e.g., which may be determined by the credit issuer), a hold and/or an authorize may be renewed or repeated if the hold expires before the ACH process is completed.

In state 216 the system initiates the ACH transaction. Illustratively, the system may be allied with a bank or other financial institution (e.g., an ODFI) that has access to an ACH system, in which case the bank is directed to initiate an ACH and is provided the necessary information (e.g., the user's ABA and routing numbers, amount). Alternatively, the system itself may have direct access to the ACH process.

In state 218 the system releases or pays the desired funds as requested (e.g., to the user's account, a merchant, another user). Illustratively, the system may limit the amount of money or other value that a user may pay/transfer in one ACH transaction or from one account. Such a limit may be applicable to new users and may be raised as the user exhibits a trustworthy pattern of system usage.

In state 220 the system determines whether the ACH transaction is rejected or returned. Return of an ACH debit (e.g., because of insufficient funds in the receiver's account) may take a variable amount of time, but if not received within a threshold period (e.g., several days), the system may assume that the transaction succeeded. If the transaction is a success, the system may use the received funds to replace those released to/for the user. Further, the system may cancel the hold that was placed on the user's credit source or, alternatively, may just allow it to expire. If the ACH process succeeds, after the funds are received and applied, the illustrated procedure ends. Otherwise, if the ACH process failed, the procedure continues at state 222.

In state 222, the user's credit source is charged the amount that failed to clear through the ACH process. Thus, if the entire transaction failed, the full amount of the payment/ transfer may be charged. Otherwise, if a portion of the funds is received, the remaining funds are charged. The procedure then ends.

In one embodiment of the invention, the user may be given a bonus or rebate. For example, because of the reduced costs that may be incurred by the system for this procedure, as compared to the costs incurred for a regular credit card transaction, some of the savings may be returned to the user.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

One alternative embodiment of the invention may be implemented for other types of electronic fund transfer or transactions (besides ACH debits or credits), such as point-of-sale transfers, automated teller machine transfers, direct deposits or withdrawals of funds, transfers initiated by telephone, wire transfers, transfers resulting from debit card transactions, etc.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of accepting an ACH (Automated Clearing House) entry as a source of funds for a financial transaction, wherein the funds may be made available before the ACH entry is completed, the method comprising:

receiving a request from a first entity to conduct a transaction involving a first value;

authorizing said first value against a credit source associated with said first entity;

initiating an ACH entry in the amount of said first value; and if said ACH entry is rejected, charging all or a portion of said first value against said credit source.

2. The method of claim 1, wherein said ACH entry is an ACH debit entry.

3. The method of claim 1, further comprising holding said first value against said credit source if said authorizing is successful.

4. The method of claim 3, further comprising releasing said hold if said ACH entry clears.

5. The method of claim 1, wherein said request is received by a facilitating organization, and wherein said request includes:
   said first value;
   an identifier of an entity that is to receive said first value; and
   an option indicating that said first value is to be retrieved from an account associated with said first entity at an institution other than said facilitating organization.

6. The method of claim 5, wherein said option indicates that said first value is to be retrieved from said account via an ACH debit.

7. The method of claim 5, wherein said option is a default option in a set of options selectable by said first entity.

8. The method of claim 1, further comprising verifying that said first entity is associated with an account to which said ACH entry is targeted.

9. The method of claim 1, further comprising verifying that said first entity is associated with said credit source.

10. The method of claim 1, further comprising establishing said credit source for said first entity.

11. The method of claim 1, wherein said ACH entry is an ACH credit entry.

12. The method of claim 11, wherein said credit source is an account with a facilitating organization that receives said request from said first entity.

13. The method of claim 1, further comprising awarding said first entity a bonus if said ACH entry clears.

14. The method of claim 1, wherein said ACH entry is initiated against a source of funds different from said credit source.

15. A computer readable storage medium storing instructions that, when executed by a computer, cause the computer to perform a method of accepting an ACH (Automated Clearing House) entry as a source of funds for a financial transaction, wherein the funds may be made available before the ACH entry is completed, the method comprising:
   receiving a request from a first entity to conduct a transaction involving a first value;
   authorizing said first value against a credit source associated with said first entity;
   initiating an ACH entry in the amount of said first value; and
   if said ACH entry is rejected, charging all or a portion of said first value against said credit source.

16. A method of releasing value for a value transfer, where the value is to be provided via an ACH (Automated Clearing House) debit, before the ACH debit is completed, comprising:
   receiving a value transfer request at a facilitating organization from a first entity, wherein said value transfer comprises the transfer of a first value to a second entity;
   verifying a credit source available to said first entity;
   authorizing said first value against said credit source;
   holding said first value against said credit source;
   initiating an ACH debit entry to retrieve said first value from a first account associated with said first entity at an institution other than said facilitating organization;
   releasing said first value to said second entity before said ACH debit entry is completed or fails; and
   if said ACH debit entry fails, charging a portion of said first value against said credit source.

17. The method of claim 16, wherein said value transfer request includes a selection of said first entity to provide said first value to said facilitating organization via ACH debit.

18. The method of claim 17, wherein said selection to provide said first value via ACH debit is a default option for value transfer requests accepted by said facilitating organization.

19. The method of claim 16, wherein said verifying a credit source comprises authorizing a small value against said credit source.

20. The method of claim 16, wherein said verifying a credit source comprises establishing said credit source for said first entity.

21. The method of claim 16, wherein said value transfer comprises the transfer of said first value from said first account to a second account associated with said second entity at said facilitating organization.

22. The method of claim 16, wherein:
   said second entity comprises said first entity; and
   said value transfer comprises the transfer of said first value from said first account to a second account associated with said first entity at said facilitating organization.

23. The method of claim 16, further comprising awarding said first entity a bonus if said ACH debit entry clears.

24. The method of claim 16, wherein said first account is different from said credit source.

25. A computer readable storage medium storing instructions that, when executed by a computer, cause the computer to perform a method of releasing value for a value transfer, where the value is to be provided via an ACH (Automated Clearing House) debit, before the ACH debit is completed, the method comprising:
   receiving a value transfer request at a facilitating organization from a first entity, wherein said value transfer comprises the transfer of a first value to a second entity;
   verifying a credit source available to said first entity;
   authorizing said first value against said credit source;
   holding said first value against said credit source;
   initiating an ACH debit entry to retrieve said first value from a first account associated with said first entity at an institution other than said facilitating organization;
   releasing said first value to said second entity before said ACH debit entry is completed or fails; and
   if said ACH debit entry fails, charging a portion of said first value against said credit source.

26. A method of accepting an ACH debit as a source of funds for a fund transfer, wherein the funds may be made available before the ACH debit is completed, the method comprising:
   receiving a request from a first entity to transfer a first amount of funds;
   charging said first amount to a credit source associated with said first entity;
   initiating an ACH debit in said first amount against a source of funds other than said credit source;
   releasing said first amount for said requested transfer before said ACH debit is completed or fails; and
   if said ACH debit completes successfully, crediting said first amount to said credit source.

27. A system for facilitating a transfer of value to a recipient from a user's bank account, wherein the value may be transferred before it is received from the bank account, the system comprising:

a database configured to store financial data for a user, said financial data including:
  an identifier of an external user account at a financial institution; and
  an identifier of a credit source available to the user, wherein said credit source is different from said external account;
a request module configured to receive a request from the user to pay a first value to a recipient, wherein said first value is to be retrieved from said external account;
an ACH (Automated Clearing House) module configured to initiate an ACH debit transaction to retrieve said first value from said external account;
a credit module configured to perform one or more of the following:
  authorize said first value against said credit source;
  hold said first value against said credit source; and
  charge said first value to said credit source; and
a transfer module configured to release said first value to said recipient before said first value is received from said external account;
wherein all or a portion of said first value is charged to said credit source if said ACH debit transaction is other than successful.

* * * * *